(12) United States Patent
Miyazaki et al.

(10) Patent No.: US 7,190,430 B2
(45) Date of Patent: Mar. 13, 2007

(54) LIQUID CRYSTAL DEVICE AND MANUFACTURING METHOD THEREFOR

(75) Inventors: Takashi Miyazaki, Suwa (JP); Hiroki Nakahara, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/153,124

(22) Filed: Jun. 15, 2005

(65) Prior Publication Data
US 2005/0248711 A1    Nov. 10, 2005

Related U.S. Application Data

(62) Division of application No. 09/762,548, filed as application No. PCT/JP00/03797 on Jun. 9, 2000, now Pat. No. 6,930,745.

(30) Foreign Application Priority Data

Jun. 11, 1999  (JP) ................... 11/165236
Mar. 23, 2000  (JP) ................... 2000-82531

(51) Int. Cl.
G02F 1/1339    (2006.01)
G02F 1/13      (2006.01)
G02F 1/1345    (2006.01)

(52) U.S. Cl. ................. 349/190; 349/153; 349/150
(58) Field of Classification Search ............ 349/153, 349/190, 150, 152
See application file for complete search history.

(56) References Cited

U.S. PATENT DOCUMENTS 5,850,276 A   12/1998  Ochi et al. ............. 349/158
5,854,664 A   12/1998  Inoue et al. ............. 349/92
5,936,695 A    8/1999  Hida et al. ............. 349/153
6,380,999 B1 *  4/2002  Tannas, Jr. ............. 349/153
6,473,147 B1 * 10/2002  Nakahara et al. ......... 349/153

FOREIGN PATENT DOCUMENTS

| JP | 62-218937 | 3/1986 |
| JP | 62218937 | 9/1987 |
| JP | 08-006055 | 1/1996 |
| JP | 11-326934 | 11/1999 |
| KR | 1998-019093 | 6/1998 |

OTHER PUBLICATIONS

Communication from Japan Patent Office regarding counterpart application.

* cited by examiner

*Primary Examiner*—Toan Ton
(74) *Attorney, Agent, or Firm*—Harness, Dickey & Pierce, P.L.C.

(57) ABSTRACT

The present invention provides a manufacturing method or a structure capable of reducing occurrence of sealing defects and breaking defects by resolving defects in form of a joined area between a sealing material and an anisotropic conductive material. A sealing material (2) is formed in such a manner as to superimpose ends (2b) on alignment marks (15) formed on the surface of a first substrate (6a), an anisotropic conductive material is formed in such a manner as to superimpose ends 3b on alignment marks (16) formed on the surface of a second substrate (6b), and the sealing material 2 and the anisotropic conductive material (3) are joined by bonding the first substrate (6a) and the second substrate (6b) to form one-piece sealing section (4).

3 Claims, 14 Drawing Sheets

LIQUID CRYSTAL DEVICE AND MANUFACTURING METHOD THEREFOR

CROSS-REFERENCE TO RELATED APPLICATIONS

This application is a divisional of U.S. patent application Ser. No. 09/762,548 filed on Feb. 8, 2001 now U.S. Pat. No. 6,930,745 which is a 371 of International Application No. PCT/JP00/03797, filed Jun. 9, 2000 which claims the benefit of Japanese Application No. 11-165236 filed Jun. 11, 1999 and Japanese Application No. 2000-82531 filed Mar. 23, 2000. The disclosures of the above applications are incorporated herein by reference in their entirety.

BACKGROUND OF THE INVENTION

1. Technical Field

The present invention relates to a liquid crystal device suitably used for displaying images, such as letters, numeric characters, and pictures, by controlling the orientation of liquid crystals sealed between a pair of substrates. The present invention also relates to a method for manufacturing the liquid crystal device.

2. Background Art

In general, liquid crystal devices are formed by attaching an illuminating device, such as a backlight, and a liquid crystal-driving IC to a liquid crystal panel. The liquid crystal panel is formed by bonding a pair of substrates formed with electrodes across a sealing section so that the electrodes oppose each other, by sealing liquid crystal in a cell gap formed between the electrodes, and by bonding polarizers on the outside surfaces of the substrates.

One of the pair of substrates may be provided with a substrate protrusion protruding toward the outer periphery from the other substrate, and a wiring terminal section conductively connected to an electrode formed on the inside surface of the substrate may be formed on the surface of the substrate protrusion. To the wiring terminal section, a liquid crystal-driving IC may be directly mounted, and a conductive connecting member, such as a flexible printed circuit board (FPC), conductively connected to the liquid crystal-driving IC may be mounted.

In a conventional liquid crystal device, a part of the above sealing section for sealing liquid crystal is constituted by an anisotropic conductive material. The anisotropic conductive material is formed by, for example, mixing conductive particles into a medium, such as resin. As the conductive particles, conductive particles such as metal, or synthetic resin particles whose outer surfaces are coated by conductive layers such as plated films, are used.

The anisotropic conductive material constituting a part of the sealing section is used for connecting electrodes formed on the other substrate opposed to the substrate having the substrate protrusion to the wiring terminal section formed on the substrate protrusion.

A sealing material and the anisotropic conductive material are applied on the surface of the substrate, respectively, by printing or the like. Usually, the sealing material is applied on the surface of one substrate, and the anisotropic conductive material is applied on the surface of the other substrate. By bonding the pair of substrates to each other, the sealing material and the anisotropic conductive material are joined to each other to form a one-piece sealing section and arranged so as to surround the liquid crystal. The sealing section must provide a hermetic seal in order to seal in the liquid crystal. Therefore, ends of the sealing material and the ends of the anisotropic conductive material should be formed at positions accurately corresponding to each other.

Thus, in the conventional liquid crystal device, the distance between the ends of the substrates is measured to thereby confirm whether or not the sealing material and the anisotropic conductive material are formed at correct positions. This is very important in reducing the displacement of the sealing material relative to the anisotropic conductive material, and in preventing occurrence of defects in the sealing section, which will be described later.

In addition, in the above conventional liquid crystal device, when the sealing material on one substrate and the anisotropic conductive material on the other substrate are joined to each other when the substrates are bonded to each other, displacement of the sealing material relative to the anisotropic conductive material, and sealing defects due to insufficient sealing material or insufficient anisotropic conductive material may occur in joined areas between the sealing material and the anisotropic conductive material, or air bubbles may become entrapped into the joined areas lowering sealing strength.

On the other hand, in contrast to the above, by the displacement of the sealing material relative to the anisotropic conductive material, or when there is an excess of the sealing material or the anisotropic conductive material, the sealing section in the joined areas may spread to protrude to the inside and the outside. When the sealing section protrudes to the outside of the joined areas due to an excess of the sealing material in this way, in a substrate breaking process to be performed later (a process in which large substrates (base substrates) are bonded to each other to form a plurality of liquid crystal panels at one time, scribe lines are formed on the surface of the large base substrates, and stress is applied along the scribe lines to break the large base substrates), breaking defects may occur when the applied stress is uneven, whereby a broken-off section is formed at a site not along the scribe lines.

SUMMARY OF THE INVENTION

It is an object of the present invention to provide a structure and a manufacturing method capable of easily confirming the positional relationship between a sealing material and an anisotropic conductive material in a liquid crystal device having a sealing section composed of the sealing material and the anisotropic conductive material joined to each other as described above.

In addition, it is another object of the present invention to prevent defects in form of a sealing section in joined areas between the sealing material and the anisotropic conductive material caused by displacement of the sealing material relative to the anisotropic conductive material, or by an insufficiency or excess of these materials.

The present invention provides a liquid crystal device comprising liquid crystal sealed between a pair of substrates bonded by a sealing section; wherein the sealing section is formed so as to surround liquid crystal with a sealing material and an anisotropic conductive material joined to each other; and at least one of the pair of substrates is provided with an alignment mark at a position corresponding to the position of the sealing material or the anisotropic conductive material.

Since the alignment mark can be used for confirming the position of at least one of the sealing material and the anisotropic conductive material, the position can be confirmed very easily by visual observation or the like.

The alignment mark may preferably be provided so as to be at least partially superimposed on a joined area between the sealing material and the anisotropic conductive material, or formed so as to be adjacent to the joined area. Since the alignment mark and an end of the sealing material or the anisotropic conductive material are arranged close to each other, by the formation of the alignment mark so as to be at least partially superimposed on the joined area between the sealing material and the anisotropic conductive material, or formed so as to be adjacent to the joined area, positioning can be effected easily when forming the sealing material or the anisotropic conductive material, and the position can be confirmed very easily and accurately according to the positional relationship between the end of the sealing material or the anisotropic conductive material.

The alignment mark may preferably be provided on the pair of substrates. By the formation of the alignment mark on both of the pair of substrates, both of the sealing material and the anisotropic conductive material can be positioned accurately, and the positions of both of the sealing material and the anisotropic conductive material can be confirmed.

The joined area between the sealing material and the anisotropic conductive material may preferably have a width substantially the same as, or narrower than other portions of the sealing material and the anisotropic conductive material. If the sealing material and the anisotropic conductive material are joined, the sealing material and the anisotropic conductive material are superimposed and adhere to each other in the joined area, whereby the width of the sealing section in the joined area is usually widened. However, if the width of the sealing section increases, defects of the sealing section are apt to occur as described above. To avoid this, the ends of the sealing material and the anisotropic conductive material to be joined are formed in such a manner that the amount of materials thereof is smaller than that of the other portions, whereby the width of the sealing section can be made substantially the same as the other portions, or narrower than the other portions.

In addition, the present invention provides a liquid crystal device comprising liquid crystal sealed between a pair of substrates bonded by a sealing section; wherein the sealing section is formed so as to surround liquid crystal with a sealing material and an anisotropic conductive material joined to each other; and at least one of the pair of substrates is provided with an alignment mark formed so as to be at least partially superimposed on a joined area between the sealing material and the anisotropic conductive material, or formed so as to be adjacent to the joined area.

The alignment mark may preferably be provided on the pair of substrates.

The sealing section may preferably have a width substantially the same as, or narrower than other portions of the sealing material and the anisotropic conductive material in the joined area between the sealing material and the anisotropic conductive material.

Furthermore, the present invention provides a method for manufacturing a liquid crystal device comprising liquid crystal sealed between a pair of substrates bonded by a sealing section; wherein an alignment mark is formed on the surface of at least one of the pair of substrates; one of a sealing material and an anisotropic conductive material is arranged on the surface of one of the substrates corresponding to the position of the alignment mark; the other one of the sealing material and the anisotropic conductive material is arranged on the surface of the other one of the substrates; and the pair of substrates are bonded to each other so that an end of the sealing material and an end of the anisotropic conductive material are joined to each other, and the sealing section is formed in the shape of surrounding liquid crystal by the sealing material and the anisotropic conductive material joined to each other.

The alignment mark may preferably be formed so as to be at least partially superimposed on a joined area between the sealing material and the anisotropic conductive material, or formed so as to be adjacent to the joined area.

At least one of the width and the length of the alignment mark may preferably be formed to substantially coincide with at least one of the width and the length of the sealing material or the anisotropic conductive material. When the width of the alignment mark is substantially equal to the width of the sealing material or the anisotropic conductive material, or when the length of the alignment mark is substantially equal to the length of the sealing material or the anisotropic conductive material, the positional relationship between the alignment mark and the sealing material or the anisotropic conductive material can be recognized by intuition from the widthwise and lengthwise directions. Therefore, it is possible to confirm the position of the sealing material or the anisotropic conductive material more promptly and more accurately.

In each of the above inventions, by forming an alignment mark particularly corresponding to the anisotropic conductive material, the position of the anisotropic conductive material can be easily confirmed.

Furthermore, the present invention provides a method for manufacturing a liquid crystal device comprising liquid crystal sealed between a pair of substrates bonded by a sealing section; wherein an alignment mark is formed on the surface of at least one of the pair of substrates; one of the sealing material and the anisotropic conductive material is arranged on the surface of one of the substrates corresponding to the position of the alignment mark; the other one of the sealing material and the anisotropic material is arranged on the surface of the other substrate; an end of at least one of the sealing material and the anisotropic conductive material to be joined to the other one is formed to have a width thinner than other portions or formed in a thin wall; and the pair of substrates are bonded to each other so that the end of the sealing material and the end of the anisotropic conductive material are jointed to each other, and the sealing section is formed in the shape of surrounding liquid crystal by the sealing material and the anisotropic conductive material joined to each other.

By forming the end of the sealing material or the anisotropic conductive material to have a width thinner than other portions or in a thin wall, the great increase in the width of the sealing section in the joined area between the sealing material and the anisotropic conductive material can be suppressed, so that defects caused by the sealing section can be prevented. The formation of the end of the sealing material or the anisotropic conductive material so as to have a width thinner than other portions is preferable in that it can be easily realized from a manufacturing viewpoint such that the width can be easily controlled when the sealing material or the anisotropic conductive material is formed by printing or the like.

The width of the alignment mark may preferably be formed to substantially coincide with the width of the end of at least one of the sealing material and the anisotropic material to be joined to the other one. By forming the width of the alignment mark so as to substantially coincide with the width of at least one of the sealing material and the anisotropic conductive material, the positional relationship between the alignment mark and the sealing material or the anisotropic conductive material can be recognized by intuition in the widthwise direction, so that the position of the sealing material or the anisotropic conductive material can be confirmed more promptly and more accurately.

The end of the sealing material and the end of the anisotropic conductive material joined to each other may preferably be formed to have widths thinner than other portions or formed in thin walls. The end of the sealing material and the end of the anisotropic conductive material joined to each other are formed to have widths thinner than other portions or formed in thin walls, whereby the increase in the width of the sealing section can be reduced more effectively in the joined area between the sealing material and the anisotropic conductive material. In particular, it is preferable from a manufacturing viewpoint that the widths of both ends be formed thinner than the other portions.

In addition, the present invention provides a liquid crystal device comprising liquid crystal sealed between a pair of substrates bonded by a sealing section; wherein the sealing section is formed so as to surround liquid crystal with a sealing material and an anisotropic conductive material joined to each other; and a joined area between the sealing material and the anisotropic conductive material is formed to have a width substantially the same as, or thinner than other portions.

Furthermore, the present invention provides a liquid crystal device comprising liquid crystal sealed between a pair of substrates bonded by a sealing section; wherein the sealing section is formed so as to surround liquid crystal with a sealing material and an anisotropic conductive material joined to each other; and at least one of inner edge and outer edge in a joined area between the sealing material and the anisotropic conductive material is formed in a flat shape with respect to portions of both sides of the joined area, or in a shape retracted from portions of both sides.

The distance between portions of both sides of the joined area and an outer edge of a liquid crystal display area formed inside the sealing section may preferably be formed longer than the distance between the portions of both sides of the joined area and a substrate outer edge located outside the sealing section; and an outer edge of the joined area may preferably be formed in a flat shape with respect to the portions of both sides of the joined area, or in a shape retracted from portions of both sides. In the case where the distance between the portions of both sides of the joined area and the substrate outer edge is shorter than the distance between the portions of both sides of the joined area and the outer edge of the liquid crystal display area, when forming the substrate outer edge by breaking substrate base materials after bonding a pair of large-area substrate base materials by the sealing section, if the sealing section expands outward (toward a break predetermined line) in the joined area between the sealing material and the anisotropic conductive material, breaking defects may occur. Therefore, when the outer edge of the sealing section in the joined area between the sealing material and the anisotropic conductive material is formed in a flat shape with respect to portions of both sides of the joined area, or in a shape retracted with respect to the portions of both sides, the sealing section does not expand to the outside, so that the risk of occurrence of breaking defects of the substrate in the manufacturing step is reduced. In this case, the inner edge of the joined area may protrude inward from the portions of both ends of the joined area.

In contrast to the above, the distance between portions of both sides of the joined area and an outer edge of a liquid crystal display area formed inside the sealing section may preferably be formed shorter than the distance between portions of both sides of the joined area and a substrate outer edge located outside the sealing section; and an inner edge of the joined area may preferably be formed in a flat shape with respect to the portions of both sides of the joined area, or in a shape retracted from portions of both sides. In the case where the distance between the portions of both sides of the joined area between the sealing material and the anisotropic conductive material and the outer edge of the liquid crystal display area is shorter than the distance between the portions of both ends of the joined area and the substrate outer edge, if the sealing section expands inward in the joined area, the sealing section approaches the outer edge of the liquid crystal display area formed inside the sealing section in the joined area, so that the cell gap of the outer periphery of the liquid display area can be easily affected. Therefore, the inner edge of the sealing section in the joined area is formed in a flat shape with respect to the portions of both sides of the joined area, or in a shape retracted from the portions of both sides, whereby the adverse effect on the cell gap of the outer periphery of the liquid crystal display area is prevented. In this case, the outer edge of the joined area may protrude from the portions of both sides of the joined area.

The present invention provides a method for manufacturing a liquid crystal device comprising liquid crystal sealed between a pair of substrates bonded by a sealing section; wherein one of a sealing material and an anisotropic conductive material is arranged on the surface of one of the substrates; the other one of the sealing material and the anisotropic conductive material is arranged on the surface of the other one of the substrates; an end of at least one of the sealing material and the anisotropic conductive material to be joined to the other one is formed to have a width thinner than other portions or formed in a thin wall; and the pair of substrates are bonded to each other so that the end of the sealing material and the end of the anisotropic conductive material are jointed to each other, and the sealing section is formed in the shape of surrounding liquid crystal by the sealing material and the anisotropic conductive material joined to each other.

The ends formed to have a width thinner than the other portions may preferably be formed in a shape such that both of an inner edge and an outer edge thereof are retracted from other portions.

In addition, the distance between portions of both sides of a joined area between the sealing material and the anisotropic conductive material and an outer edge of a liquid crystal display area formed inside the sealing section may preferably be formed longer than the distance between the portions of both sides of the joined area and a substrate outer edge located outside the sealing section; and an outer edge of the end formed to have a width thinner than the other portions may preferably be formed in a flat shape with respect to the other portions, or formed in a shape retracted from the portions of both sides of the joined area.

In contrast to the above, the distance between portions of both sides of a joined area between the sealing material and the anisotropic conductive material and an outer edge of a liquid crystal display area formed inside the sealing section may preferably be formed shorter than the distance between the portions of both sides of the joined area and a substrate outer edge located outside the sealing section; and an inner edge of the end formed to have a width thinner than the other portions may preferably be formed in a flat shape with respect to the other portions, or formed in a shape retracted from the portions of both sides of the joined area.

Furthermore, in the above invention, the alignment mark may preferably be formed of the same transparent conductive member as transparent electrodes and wiring formed on the surfaces of the substrates. The alignment mark may preferably be formed at the same time of the formation of the transparent electrodes and wiring on the surfaces of the substrates.

In addition, it is preferable in accurately confirming the position of the sealing material or the anisotropic conductive material that all of the alignment mark be substantially superimposed on the end of the sealing material or the anisotropic conductive material.

Furthermore, the end of the sealing material and the end of the anisotropic conductive material may preferably be formed in the same shape so as to be superimposed each other when the substrates are bonded to each other. The end of the sealing material and the end of the anisotropic conductive material joined to each other are formed in the same shape, whereby formation of air bubbles in the sealing section in the joined area, or occurrence of sealing defects can be prevented even if the slight displacement of the position of the sealing material relative to the position of the anisotropic conductive material occurs.

PREFERRED MODE FOR CARRYING OUT THE INVENTION

Description will now be given of a preferred mode for carrying out the invention.

Figure 1:
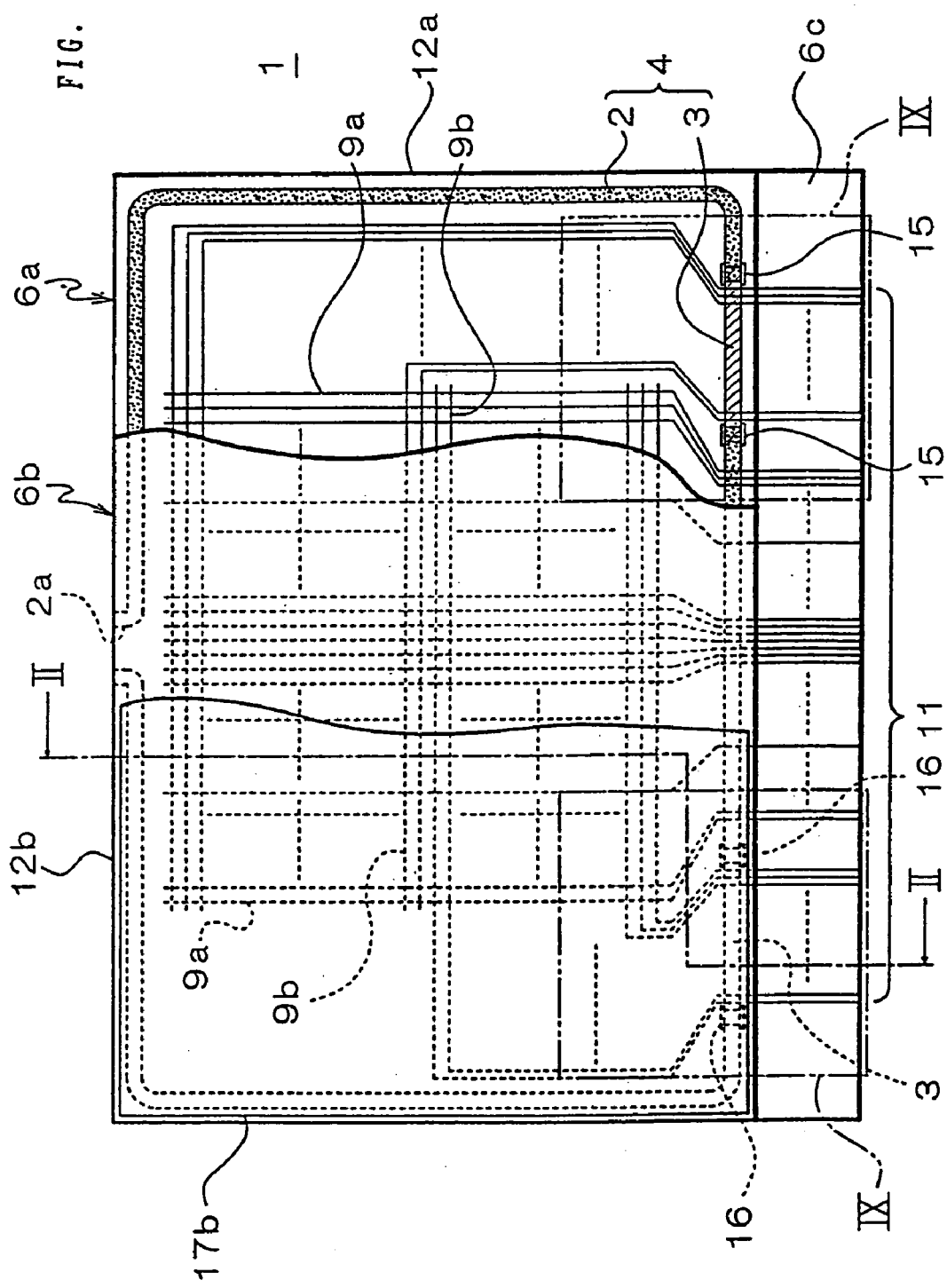
FIG. 1 is a partly broken plan view showing the structure of a liquid crystal panel that is a principal part of an embodiment of a liquid crystal device according to the present invention.
Figure 2:
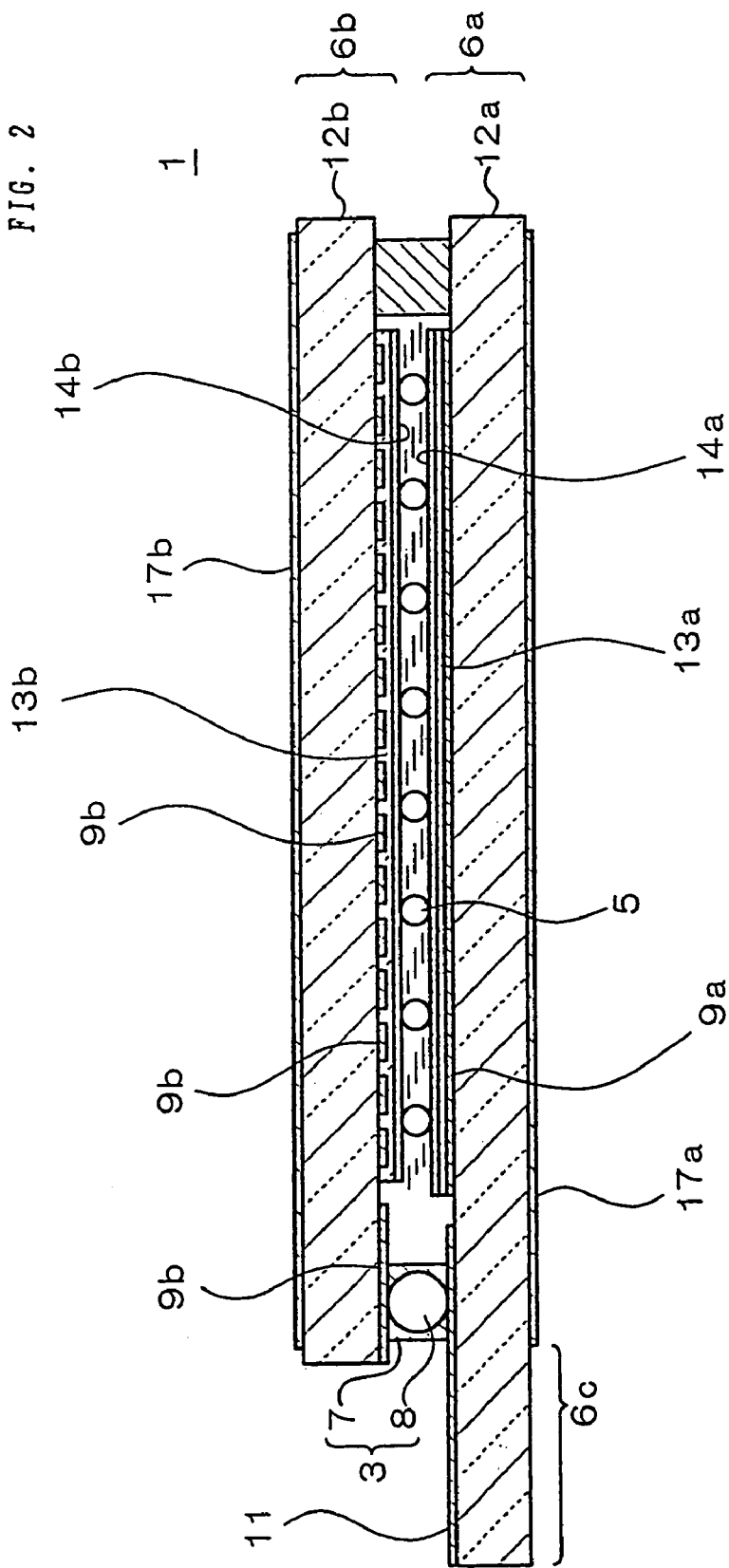
FIG. 2 is a sectional view schematically showing a cross sectional structure of the panel in a section taken along the line II—II in FIG. 1.

FIG. 1 shows a liquid crystal panel 1 that is a principal part of a liquid crystal device of an embodiment according to the present invention. FIG. 2 shows a panel structure of the liquid crystal panel 1 by a section taken along the line II—II in FIG. 1. The liquid crystal device of this embodiment are formed by attaching an illuminating device, such as a backlight, for illuminating the liquid crystal panel from behind, a liquid crystal driving circuit, such as a liquid crystal-driving IC, for driving the liquid crystal panel, a conductive-connecting member, such as a flexible printed circuit board, for conductive-connecting the liquid crystal panel to the outside, and other various types of additional devices to the liquid crystal panel 1.

The liquid crystal panel 1 includes a cell structure such that a sealing material 2 and an anisotropic conductive material 3 are joined so as to be connected to each other and consequently, a first substrate 6a and a second substrate 6b are bonded by an annularly formed sealing section 4. The sealing material 2 is formed in a predetermined shape by printing or the like using epoxy resin as a material. The anisotropic conductive material 3 has conductive particles 8 dispersed in a non-conductive resin material 7, as shown in FIG. 2.

The first substrate 6a has first electrodes 9a formed on the inside surface of a first substrate material 12a, that is, the surface opposing the second substrate 6b, an overcoat layer 13a formed thereon, and an alignment layer 14a formed thereon. On the other hand, the second substrate 6b has second electrodes 9b formed on the inside surface of a second substrate material 12b, that is, the surface opposing the first substrate 6a, an overcoat layer 13b formed thereon, and an alignment layer 14b formed thereon. In FIG. 1, in order to easily understand the structure, the alignment layers and overcoat layers are omitted for convenience.

The first substrate material 12a and the second substrate material 12b are formed by a light-transmitting material, such as glass, synthetic resin, and the like. The first electrodes 9a and the second electrodes 9b are formed by a light-transmitting conductive material, such as ITO (Indium Tin Oxide). The overcoat layer 13a and the overcoat layer 13b are formed of, for example, silicon oxide, titanium oxide, or a mixture including them. The alignment layer 14a and the 14b are formed of, for example, polyimide resin.

As shown in FIG. 1, the first electrodes 9a are formed as a plurality of linear wiring patterns, and the second electrodes 9b are formed as a plurality of wiring patterns extending in a direction intersecting perpendicularly to the first electrodes 9a. The first electrodes 9a and the second electrodes 9b are arranged parallel to each other, in a so-called stripe shape. Areas where the first electrodes 9a and the second electrodes 9b intersect each other serve as pixels arranged in a dot matrix, and a liquid crystal display area is constituted by the collection of these pixels.

Figure 5:
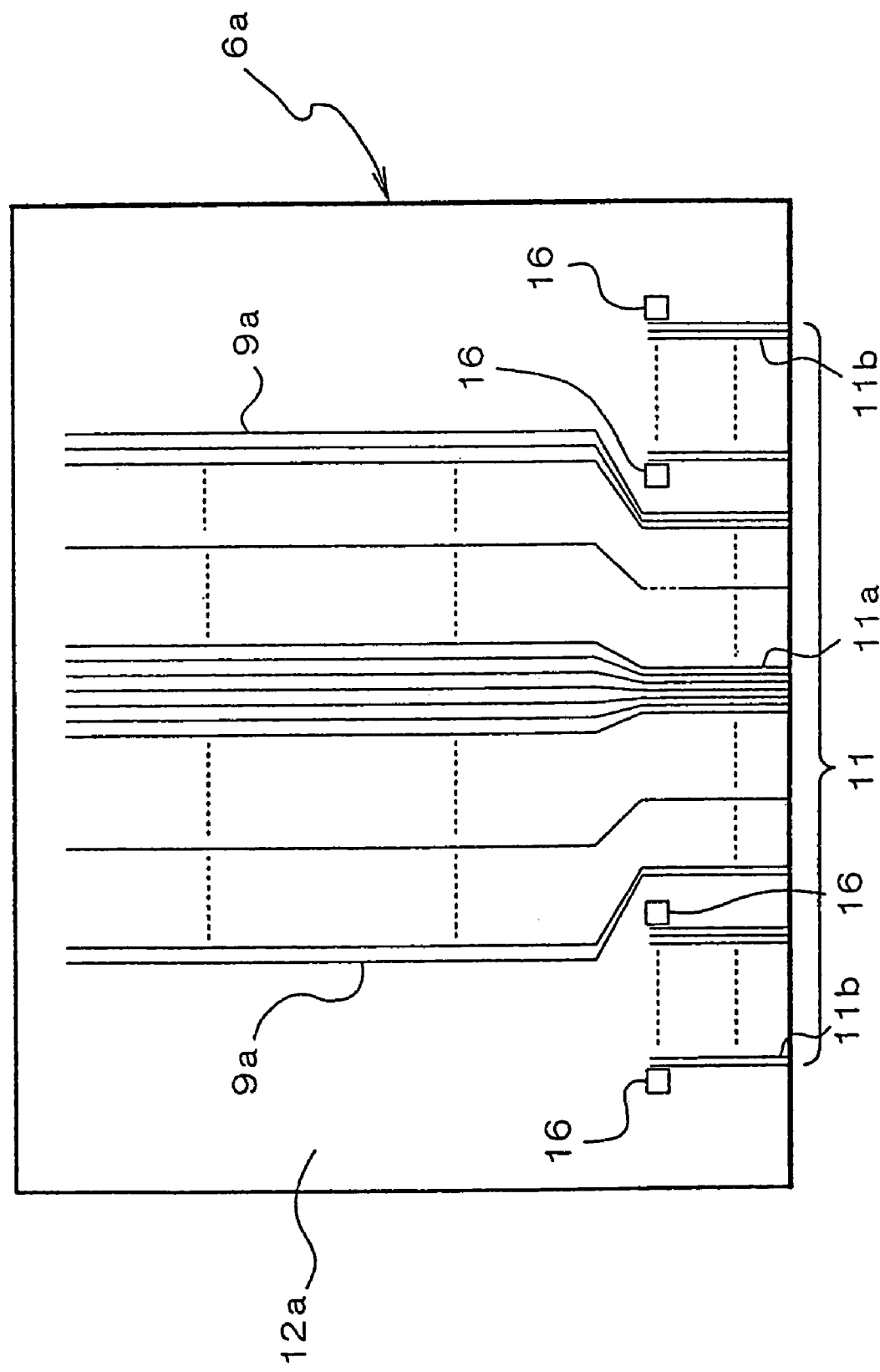
FIG. 5 is a plan view showing a state in a halfway of manufacturing the substrate shown in FIG. 3.

The first substrate 6a includes a substrate protrusion 6c protruding to the outside from the outer edge of the second substrate 6b. A wiring terminal section 11 consisting of a plurality of linear wiring patterns is formed on the surface of the substrate protrusion 6c. FIG. 5 is a plan view of the first substrate 6a formed with the first electrodes 9a. A plurality of first terminals 11a arranged in the center of the first electrodes 9a and the wiring terminal section 11 are integrally formed on the surfaces of the first electrodes 6a, and a plurality of second terminals 11b are provided on both sides of the wiring terminal section 11. Furthermore, alignment marks 15 each having a pair of square plane shape are provided on both inner ends of the second terminal 11b. All of them are formed of a transparent conductive member, such as ITO, by sputtering or the like.

Figure 3:
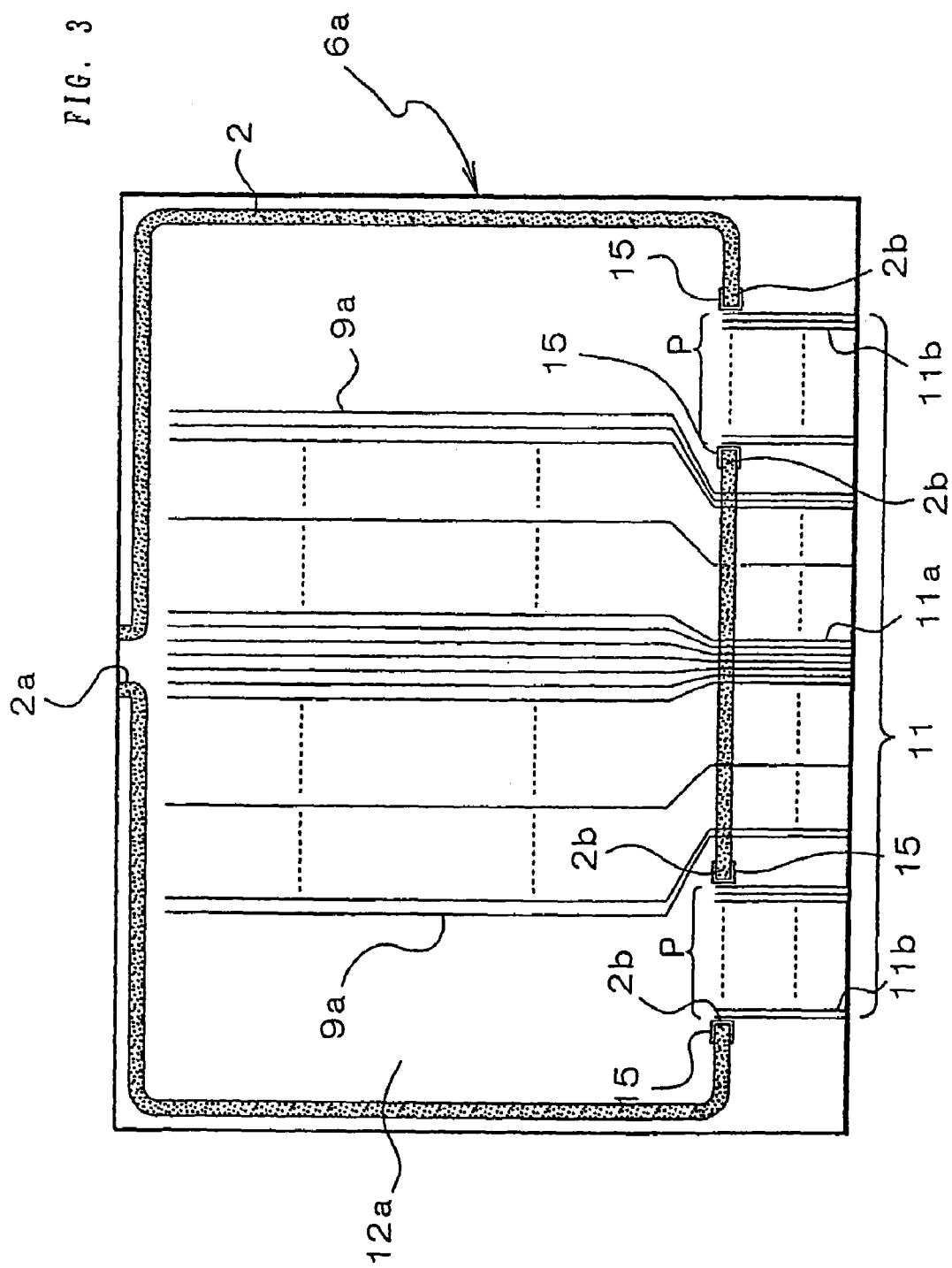
FIG. 3 is a plan view of one substrate constituting the liquid crystal panel shown in FIG. 1.

As shown in FIG. 3, the sealing material 2 is formed on the surface of the first substrate 6a along the outer edge of the substrate. The sealing material 2 is formed substantially in the shape of O except the portions P where the inner edges of the second terminal 11b is arranged (hereinafter, simply referred to as "vertical conduction areas"). A liquid crystal injection port 2a is formed in a part of the sealing material 2. Furthermore, ends 2b adjacent to the vertical conduction areas are formed at positions just above the alignment marks 15. In FIG. 3, the overcoat layer 13a and the alignment layer 14a are also omitted.

Figure 6:
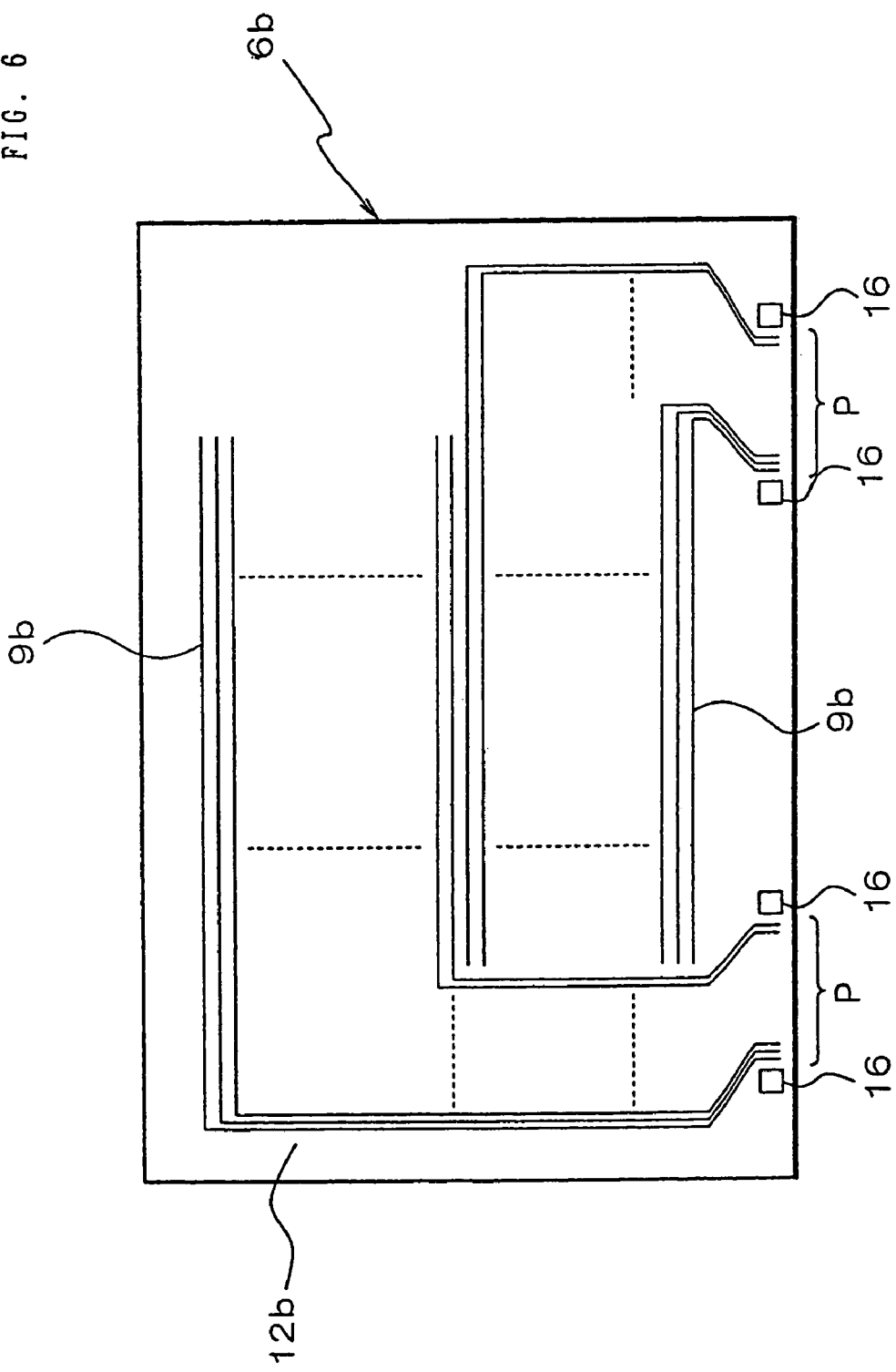
FIG. 6 is a plan view showing a state in a halfway of manufacturing the substrate shown in FIG. 4.

FIG. 6 is a plan view of the second substrate 6b after the second electrodes 9b are formed thereon. A number of second electrodes 9b are formed on the surface of the second substrate 6b in the form of stripes, and the second electrodes 9b extend to the vertical conduction areas P through the periphery of the second substrate. In addition, alignment marks 16 are simultaneously formed on both sides of the vertical conduction areas P. The second electrodes 9b and the alignment marks 16 are simultaneously formed of a transparent conductive member, such as ITO, by sputtering or the like.

Figure 4:
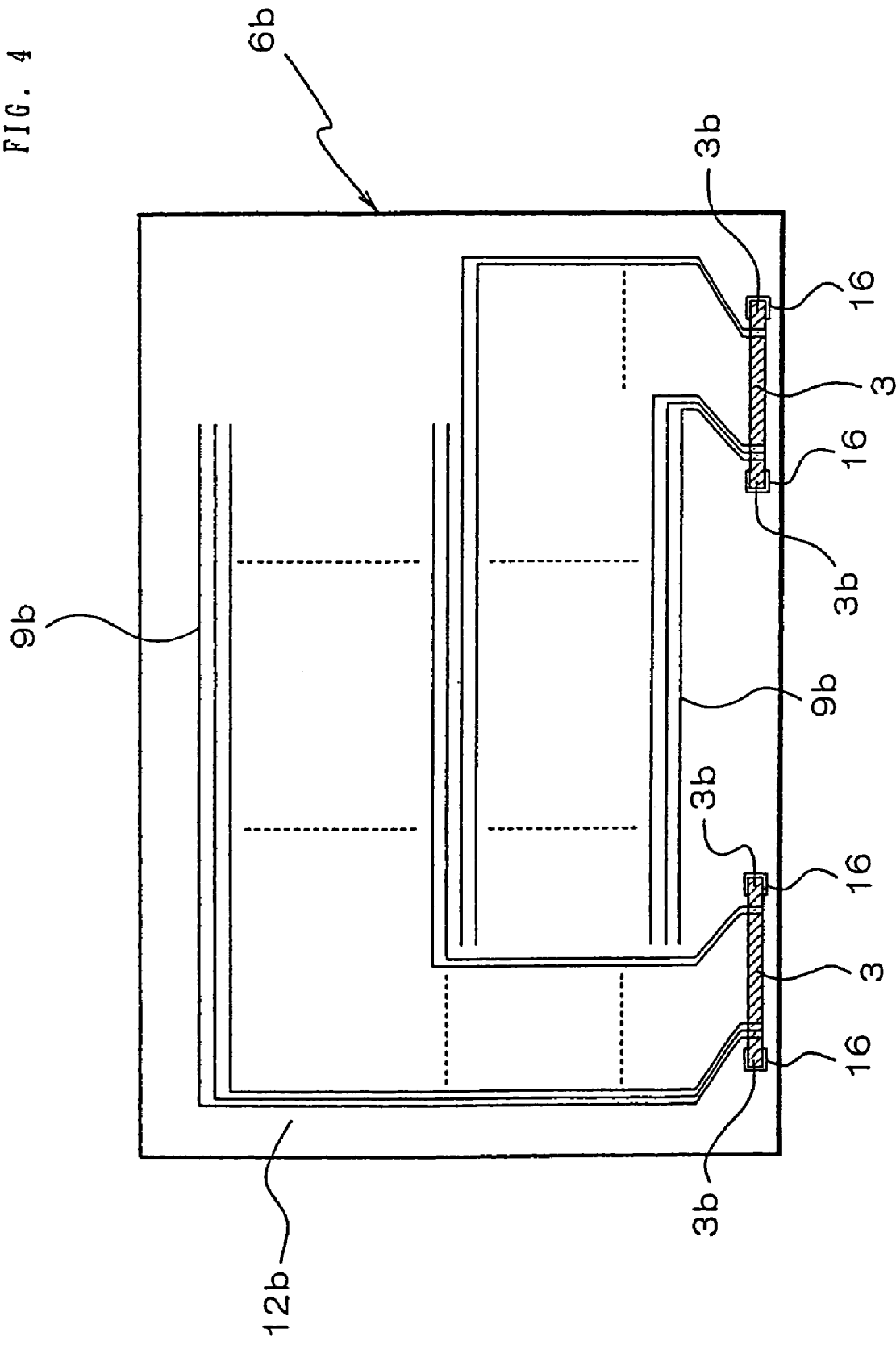
FIG. 4 is a plan view of the other substrate constituting the liquid crystal panel shown in FIG. 1.

On the second substrate 6b, as shown in FIG. 4, the anisotropic conductive materials 3 are formed on the vertical conduction areas P by printing or the like. The anisotropic conductive materials 3 are formed so that their ends 3b are arranged at positions just above the alignment marks 16.

In this embodiment, as described above, whether or not the anisotropic conductive materials 3 are formed at normal positions can be accurately determined by visual observation with reference to the position of the above alignment marks 16. In the conventional liquid crystal device, since the position of the anisotropic conductive material 3 should be confirmed by measuring the size of the device with reference to the end side of the second substrate 6b, the operation becomes complicated and a measurement error is apt to occur. In this embodiment, however, such inconveniences do not occur.

In this embodiment, since the ends 2b of the sealing material 2 can be positioned by the alignment marks 15, and the ends 3b of the anisotropic conductive material 3 can be positioned by the alignment marks 16, the sealing material 2 and the anisotropic conductive material 3 can be securely joined, and sealing defects can be prevented.

In particular, since whether or not the sealing material 2 is formed at a normal position can be easily confirmed with reference to the positions of the alignment marks 15 in a manner similar to the anisotropic conductive material 3 as described above, manufacturing efficiency of the liquid crystal panel can be improved, and the occurrence of defects of the sealing section can be prevented.

Although a number of first electrodes 9a, the second electrodes 9b, and terminals 11a and 11b of the wiring terminal section 11 are actually formed at very narrow intervals, the intervals are widely shown in order to easily understand the structure, and many substances are omitted in FIGS. 1 to 6.

In order to manufacture the liquid crystal panel 1 shown in FIG. 1, the second substrate 9b shown in FIG. 4 is turned over from the state shown in the figure, and is superimposed on the first substrate 6a shown in FIG. 3, and the first substrate 6a and the second substrate 6b are bonded to each other via the sealing material 2 and the anisotropic conductive material 3. In this case, relative positions of both of the substrates are determined so that the vertical conduction areas P of the first substrate 6a and the second substrate 6b accurately coincide with each other. By adjusting both of the substrates so that the alignment marks 15 and the alignment marks 16 are positioned in a predetermined relation to each other in two dimensions, accurate positioning can be effected. In this embodiment, both of the substrates are formed in advance so that the alignment marks 15 and 16 completely coincide with each other in two dimensions in a normal bonding state. Therefore, by determining the positions so that the alignment marks 15 and 16 are completely superimposed on each other, both of the substrates can be easily and securely bonded in the accurate positional relationship.

Thereafter, the first substrate 6a and the second substrate 6b are press-bonded by applying a predetermined pressure and heated in the press-bonded state, whereby the sealing material 2 and the anisotropic conductive material 3 are thermally hardened, and the first substrate 6a and the second substrate 6b are fixed to each other. In this case, in the above vertical conduction areas P, the ends 2b of the sealing material 2 and the ends 3b of the anisotropic conductive material 3 are superimposed on each other, and joined by application of pressure, whereby one-piece sealing section 4 is formed. In addition, in the vertical conduction areas P, the anisotropic conductive material 3 comes into contact with the second terminals 11b on the first substrate 6a and the second electrodes 9b on the second substrate 6b, and both of the substrates are press-bonded, whereby the second terminals 11b and the second electrodes 9b are conductively connected to each other via the conductive particles 8 mixed into the anisotropic conductive material 3.

Furthermore, liquid crystal is injected inside the liquid crystal panel 1 through the liquid crystal injection port 2a shown in FIG. 1, and the liquid crystal injection port 2a is sealed with resin after the completion of injection. Finally, polarizers 17a and 17b are bonded on the outside surfaces of the first substrate 6a and the second substrate 6b, as shown in FIG. 2, whereby the liquid crystal panel 1 is completed.

A conductive-connection member, such as a flexible wiring circuit board (not shown) is conductively connected to the wiring terminal section 11 on the substrate protrusion 6c of the thus-manufactured liquid crystal panel 1, and an illuminating device, such as a backlight, is disposed on one of the outside surfaces of the first substrate 6a and the second substrate 6b to oppose the other outside surface, a liquid crystal device is constituted. A light reflector may be disposed instead of the illuminating device to constitute a reflective liquid crystal device.

When operating the liquid crystal device, a scanning voltage is applied to either of the first electrodes 9a and the second electrodes 9b by a liquid crystal-driving IC, and a data voltage is applied to the other electrodes 9a and 9b by the liquid crystal-driving IC. This allows the scanning voltage and the data voltage to be applied to both sides of the liquid crystal in a pixel, and orientation of the liquid crystal in the pixel is changed, whereby light passing through the pixel is modulated. As a result, a desired image can be formed by light modulation states of many pixels arranged within a liquid crystal display area.

Figure 7:
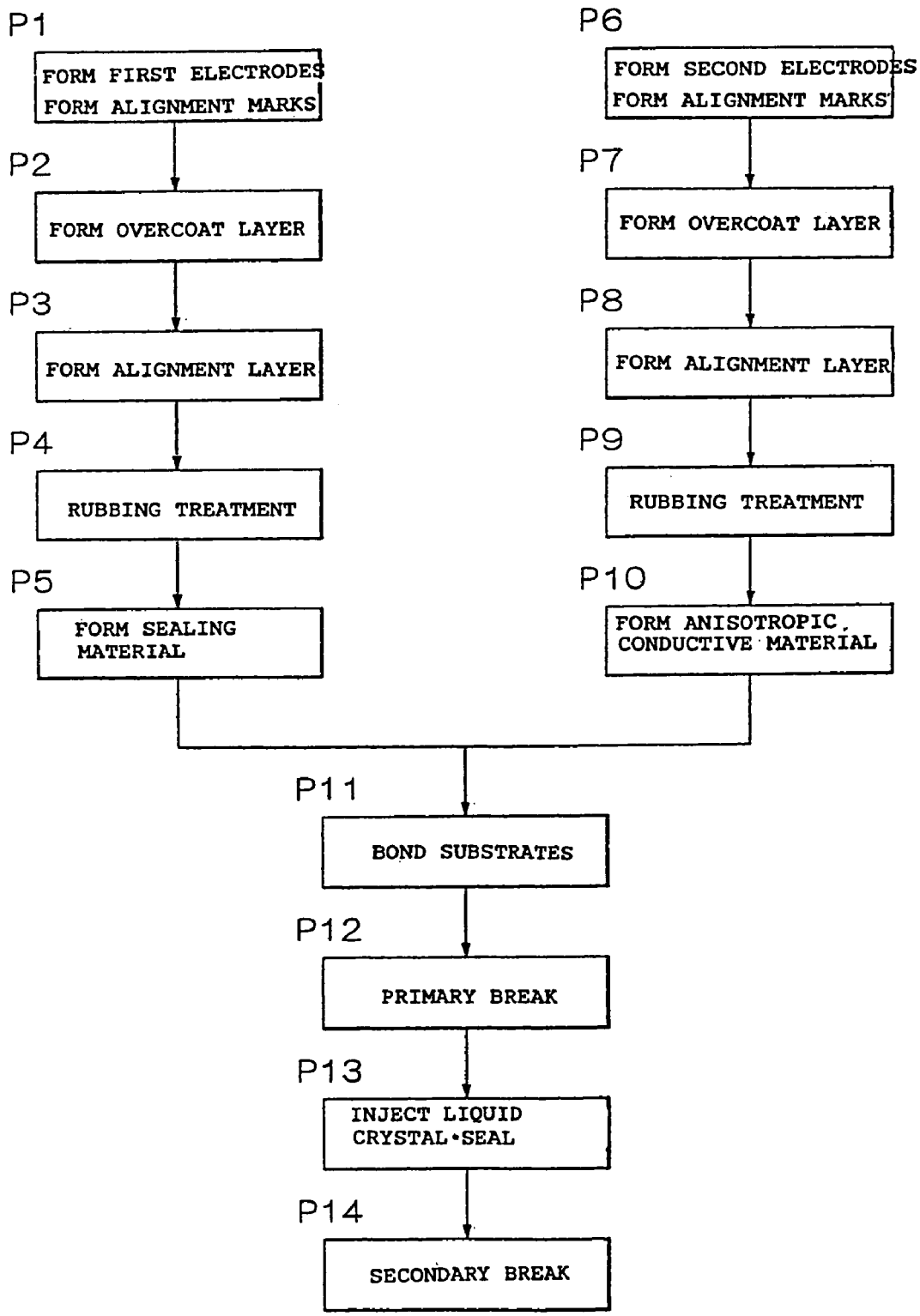
FIG. 7 is a flow chart showing an embodiment of a method for manufacturing a liquid crystal device according to the present invention.
Figure 8:
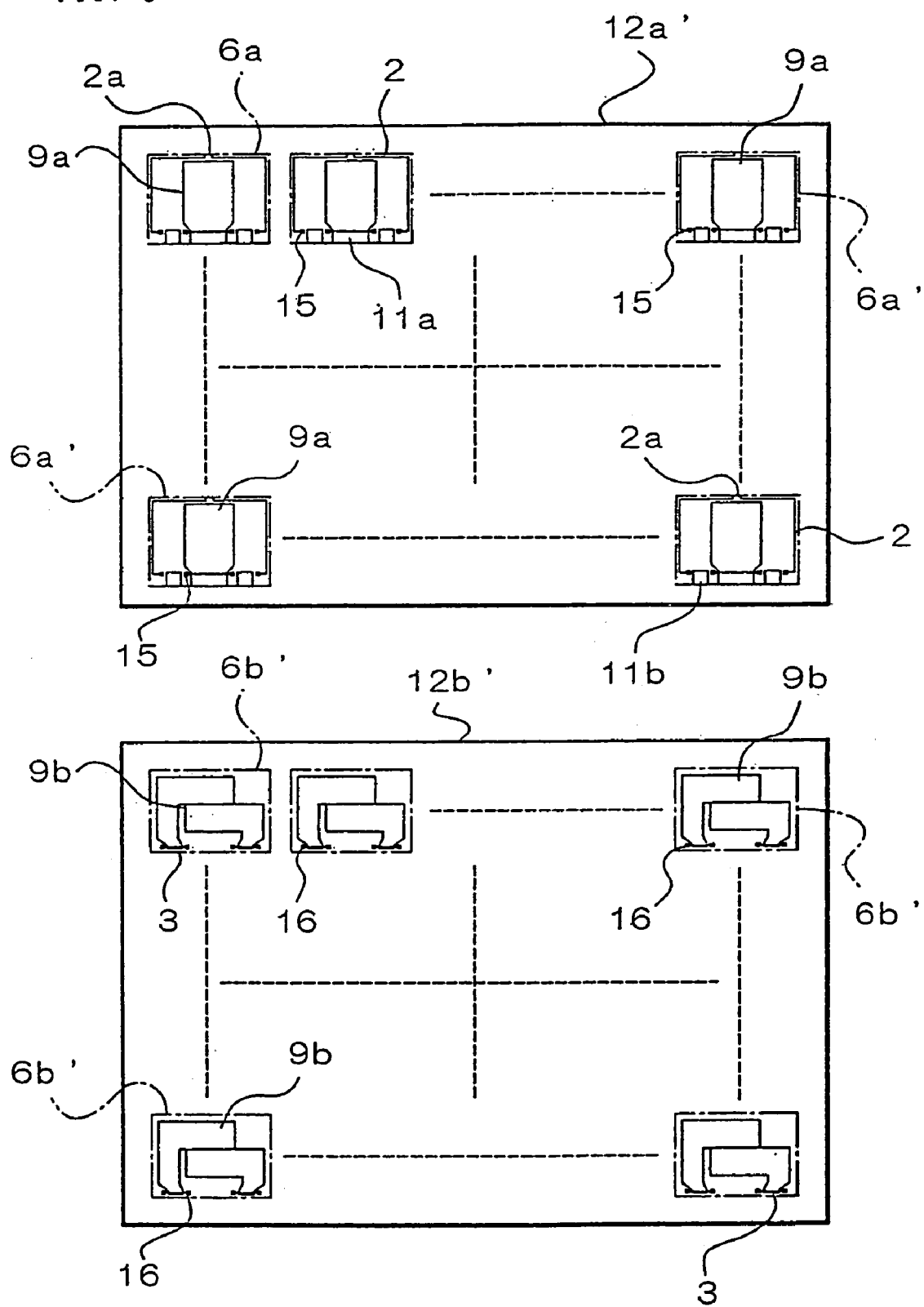
FIG. 8 is a plan view schematically showing an example of a pair of base substrates used in the manufacturing method shown in FIG. 7.

Description will now be given in more detail of a method for manufacturing the liquid crystal panel 1 shown in FIG. 1. FIG. 7 shows a process of one embodiment of the method for manufacturing the liquid crystal panel 1. The first substrate 6a shown in FIG. 3 is formed through the processes P1 to P5. More specifically, a plurality of panel predetermined areas 6a' are set on the surface of a large-area first substrate base material 12a' shown in FIG. 8 that is formed of glass or synthetic resin, and a transparent conductive member, such as ITO, is bonded by sputtering or the like so that the first electrodes 9a, the alignment marks 15, and the wiring terminal section 11 formed on the surface of the first substrate 6a shown in FIG. 3 are formed for each of the panel predetermined areas 6a', and then a pattern is formed using a known patterning method, for example, a photolithography method (process P1).

Next, the overcoat layer 13a is formed by, for example, offset printing using silicon oxide, titanium oxide, or a mixture including them as a material (process P2). The alignment layer 14a is formed thereon by, for example, offset printing using polyimide resin or the like as a material (process P3). Rubbing treatment is applied to the alignment layer 14a by a method such that the surface is rubbed with a rubbing roller (process P4). Thereafter, the sealing material 2 is formed by, for example, screen printing, so that the pattern shown in FIG. 3 is formed for each of the panel predetermined areas 6a' (process P5).

On the other hand, the second substrate 6b shown in FIG. 4 is formed through the processes P6 to P10. More specifically, a plurality of panel predetermined areas 6b' are set on the surface of a large-area second substrate base material 12b' shown in FIG. 8 that is formed of glass or synthetic resin, and a transparent conductive member, such as ITO, is bonded by sputtering or the like so that the second electrodes 9b and the alignment marks 16 formed on the surface of the second substrate 6b shown in FIG. 4 are formed for each of the panel predetermined areas 6b', and then a pattern is formed using a known patterning method, for example, a photolithography method (process P6).

Next, the overcoat layer 13b is formed by, for example, offset printing using silicon oxide, titanium oxide, or a mixture including them as a material (process P7). The alignment layer 14b is formed thereon by, for example, offset printing using polyimide resin or the like as a material (process P8). Rubbing treatment is applied to the alignment layer 14a by a method such that the surface is rubbed with a rubbing roller (process P9). Thereafter, the anisotropic conductive material 3 is formed by, for example, screen printing, so that the pattern shown in FIG. 4 is formed for each of the panel predetermined areas 6b' (process P10).

The first substrate base material 12a' and the second substrate base material 12b' formed as described above are then bonded to each other in an aligned state, and are subjected to press-bonding treatment, that is, heating treatment and pressure treatment, whereby they are fixed to each other by the sealing material 2 and the anisotropic conductive material 3 (process P11). In this way, a large-area panel structure including a plurality of liquid crystal panel structures is formed.

Then, the large-area panel structure is subjected to primary break to separate the panel structure in the form of strips, and the liquid crystal injection port 2a formed in a part of the sealing material 2 is exposed to the outside (process P12), liquid crystal is injected into each of the liquid crystal panel portions through the liquid crystal injection port 2a, and the liquid crystal injection port 2a is sealed with resin after the completion of injection (process P13). Thereafter, a secondary break is executed to separate potions corresponding to the liquid crystal panel 1 shown in FIG. 1 from each other (process P14).

Figure 9:
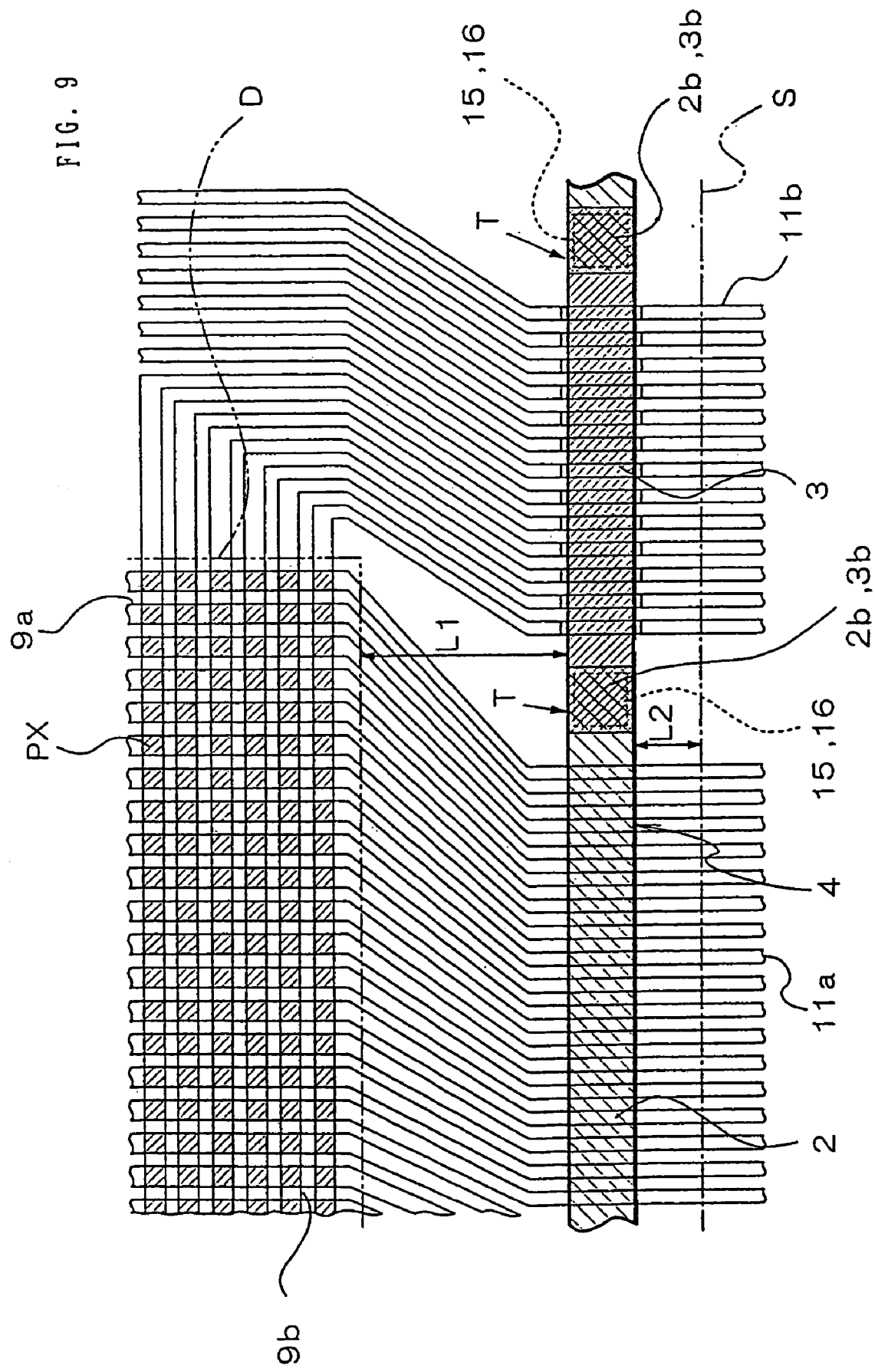
FIG. 9 is a plan view showing an enlarged plane in a halfway of manufacturing in a portion corresponding to the area IX surrounded by two-dot chain line shown in FIG. 1.

Description will now be given of a detail structure of the above embodiment according to the present invention with reference to FIG. 9. FIG. 9 shows the enlarged planar structure of a portion corresponding to the portion within the area ₊¥ in FIG. 1.

The sealing material 2 is formed so that the ends 2b are arranged on the alignment marks 15 formed on the first substrate base material 12a', the anisotropic conductive material 3 is formed so that the ends 3b are arranged on the alignment marks 16 formed on the second substrate base material 12b', the sealing material 2 and the anisotropic conductive material 3 are joined in joined areas T where the ends 2b and the ends 3b are superimposed on each other, and the one-piece sealing section 4 is provided.

In addition, the pixels P constituted as areas where the first electrodes 9a intersect the second electrodes 9b are arranged in a dot matrix inside the liquid crystal display area D. In addition, with respect to the panel structure composed of the bonded first substrate base material and the second substrate base material, scribe lines (grooves) are formed on the surfaces of the substrates along the break predetermined line S in order to form the liquid crystal panel 1 shown in FIG. 1. Stress is applied along the scribe lines, whereby the second substrate base material is broken.

In this embodiment, the outer edge of the liquid crystal display area D is arranged inside the sealing section 4 consisting of the sealing material 2 and the anisotropic conductive material 3, and the break predetermined line S are arranged outside of the sealing section 4. If the distance L1 between both sides of the joined areas T in the sealing section 4 is compared with the distance L2 between the both sides of the joined areas T in the sealing section 4 and the break predetermined line S, the distance L1 is longer than the distance L2 in this embodiment.

Since the ends 2b of the sealing material 2 and the ends 3b of the anisotropic conductive material 3 are superimposed on each other, if the ends 2b and 3b are formed on the first substrate base material 12a' and the second substrate base material 12b' so as to have the same thickness as the thickness of the portion other than the ends, the width of the joined areas T in the sealing section 4 is increased to be wider than the width of the portions other than the joined areas T when bonding the first substrate base material 12a' and the second substrate base material 12b' are bonded, so that the sealing section 4 in the area is formed so as to expand both inward and outward.

In this embodiment, the ends 2b of the sealing material 2 and the ends 3b are formed in such a manner that the amount of materials thereof is smaller than that of the other portions, and the width of the sealing section 4 in the joined areas T is about equal to the width of other sealing section 4. As a result, the sealing section 4 in the joined area T expands both inward and outward.

When the inner edge of the sealing section 4 expands inward in the joined areas T, approach of the sealing section 4 to the outer edge of the liquid crystal display area D, or entry of the sealing section 4 into the liquid crystal display area D when the distance L1 is short is prevented. Since the change in the width of the sealing section 4 in the joined areas T affects the cell gap in the liquid crystal display area D, the grade of the image of liquid crystal display is affected. In addition, if the sealing section 4 enters into the liquid crystal display area D, a portion incapable of displaying is partially generated in the outer edge of the liquid crystal display area D, thereby producing a defective.

Conversely, if the outer edge of the sealing section 4 greatly expands outward in the joined areas T, the sealing section 4 may reach the break predetermined line S. In particular, since the distance L2 is shorter than the distance L1, the possibility for the sealing section 4 to reach the break predetermined line S is higher than the possibility for reaching the outer edge of the liquid crystal display area D. If the outer edge of the sealing section 4 reaches the break predetermined line S, when applying stress to break the second substrate base material along the scribe lines after forming the scribe lines along the break predetermined line S, the broken-off section may bend from the portion contacting the sealing section 4 to cause breaking defects. In addition, even if breaking of the substrate material is completed, both sides of a break line may be fixed by the sealing section 4, whereby the second substrate base material cannot be separated.

In this embodiment, since the sealing section 4 in the joined areas T is formed to have the substantially same width as the width of other portions other than the joined areas T, the above-described inconveniences do not occur, and defects caused by the sealing section 4 can be prevented.

Description will now be given of an example of end shape of the sealing material and the anisotropic conductive material in the above embodiment. This example relates to the end shape of the sealing material and the anisotropic conductive material for forming the width of the sealing section 4 in the joined areas T so as not to increase with respect to the width of the sealing section 4 other than the joined areas T, forming the width of the sealing section 4 in the joined areas T so as to be about equal to the width of the sealing section 4 other than the joined areas T, or forming the width of the sealing section 4 so as to be smaller than the width of the sealing section 4 other than the joined areas T. Therefore, this example includes the liquid crystal panel structure similar to the above embodiment, and differs from the above embodiment only in the structure of the sealing section composed of the sealing material and the anisotropic conductive material.

Figure 10:
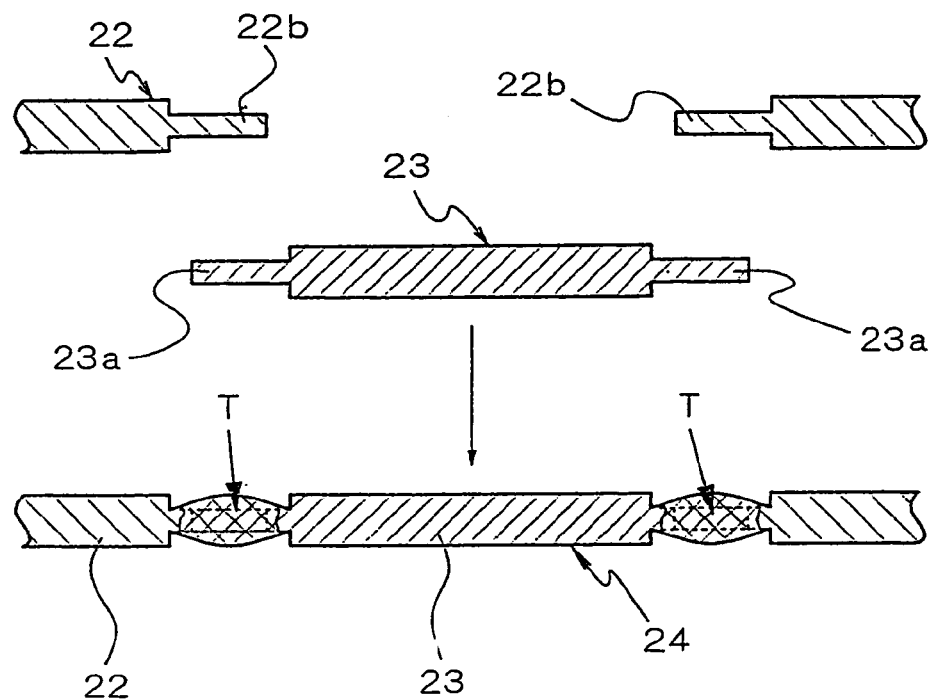
FIG. 10 includes diagrams showing an enlarged plane before joining and an enlarged plane after joining for showing an example of the shape of a joint portion between a sealing material and an anisotropic conductive material.

FIG. 10 includes enlarged plan views of the planar shape near joined areas between a sealing material and an anisotropic conductive material before and after bonding substrates, respectively. Ends 22b of a sealing material 22 and ends 23b of an anisotropic conductive material 23 are formed to have narrower widths of portions other than the ends 22b and 23b. For this reason, when the sealing material 22 and the anisotropic conductive material 23 are joined to each other by bonding the substrates, the width of a sealing section 24 in joined areas T becomes narrower than twice the width of the sealing section 24 other than the joined areas T. In the example shown in the figure, the width of the sealing section 4 in the joined areas T is narrower than the width of other portions.

The end shape of the sealing material and the anisotropic conductive material in this case can be easily formed by printing similar to the above description. In addition, the end shape can also be easily formed with the use of a precise dispenser that is formed so that the sealing material or the anisotropic conductive material is accommodated and a material is injected from a nozzle by applying a pressure.

Figure 11:
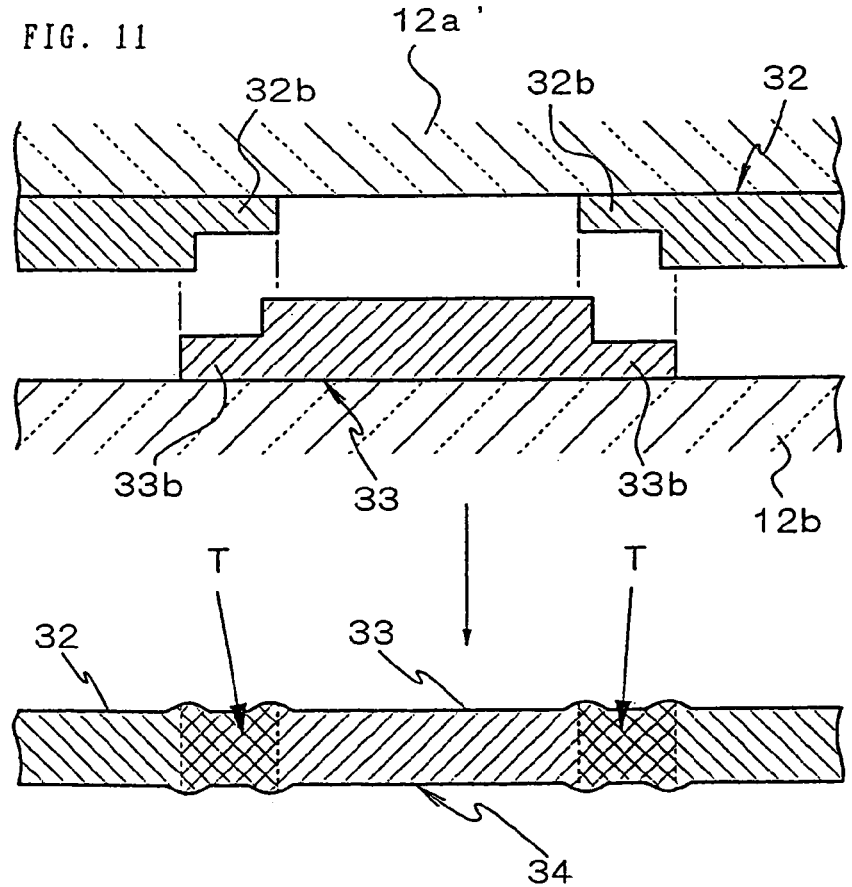
FIG. 11 includes diagrams showing an enlarged plane before joining and an enlarged plane after joining for showing another example of the shape of a joint portion between a sealing material and an anisotropic conductive material.

Description will now be given of another example of the end shape of the sealing material and the anisotropic conductive material in the above embodiment with reference to FIG. 11. Similarly to the above example, this example also differs from the above embodiment only in the vicinity of the joined areas between the sealing material and the anisotropic conductive material. FIG. 11 includes a sectional view showing the end shape of the sealing material and the anisotropic conductive material before bonding the substrates, and a plan view after bonding the substrate.

As shown in FIG. 11, before bonding the substrate, ends 32b of a sealing material 32 formed on a first substrate base material 12a' and ends 33b of a sealing material 33 provided on a second substrate base material 12b' are formed to be thinner than portions other than the ends 32b and 33b. Even if the ends 32b of the sealing material 32 and the ends 33b of the anisotropic conductive material 33 are superimposed and joined to each other when bonding the first substrate base material 12a' and the second substrate base material 12b', this may allow the width of a sealing section 34 to slightly increase as compared to portions other than the joined areas T, and inconveniences due to expansion of the sealing section does not occur.

The end shape of the sealing material and the anisotropic conductive material can be easily formed with the use of a precise dispenser that is formed so that the sealing material or the anisotropic conductive material is accommodated and a material is injected from a nozzle by applying a pressure.

In either of the above two examples, when joining the ends of the sealing material and the ends of the anisotropic material by decreasing the amount of materials at the ends of the sealing material and the anisotropic conductive material, the increasing amount of the width of the sealing section in the joined areas with respect to the width of other portions can be restricted, the width of the sealing section in the joined areas can be made substantially equal to the width of other portions, or the width of the sealing section in the joined areas can be made narrower than the width of the other portions.

Description will be given of the relationship between the planar shapes of the alignment marks 15 and 16 and the planar shapes of the ends of the sealing material 2 and the anisotropic conductive material 3 in the above embodiment with reference to FIG. 12.

The alignment mark 15 of this embodiment includes the planar structure of a rectangle (or a square) having end sides extending in a direction of extension of the sealing material 2 and the anisotropic conductive material 3 and in a direction intersecting perpendicularly to the direction of extension (A). In the figure, the length of the alignment mark 15 in the direction of extension is indicated as L15, and the width in the direction intersecting perpendicularly to the direction of extension is indicated as W15.

In contrast, the end 2b of the sealing material 2 are formed to have widths thinner than portions other than the ends in a manner substantially similar to the example shown in FIG. 10. In the figure, the length of the end 2b formed in a thin width is indicated as L2b, and the width of the end 2b is indicated as W2b (B). The length L2b of the end 2b is formed so as to be substantially equal to the length L15 of the alignment mark 15. In addition, the width W2b of the end 2b is formed so as to be substantially equal to the width W15 of the alignment mark 15. Here, substantially being equal means of being equal to such a degree that the displacement of the alignment mark 15 relative to the end 2b can be easily known by visible observation. For example, it is preferable that the difference in the size of the two be within ±50%.

The alignment mark 16 includes the planar structure of a rectangle (or a square) having end sides extending in a direction of extension of the sealing material 2 and the anisotropic conductive material 3 and in a direction intersecting perpendicularly to the direction of extension (C). The length in the direction of extension is taken as L16, and the width in the direction intersecting perpendicularly to the direction of extension is taken as W16.

On the other hand, the end 3b of the anisotropic conductive material 3 is also formed to have a width thinner than a portion other than the end. The length L3b of the end 3b is formed so as to be substantially equal to the length L16 of the alignment mark 16, and the width W3b of the end 3b is formed so as to be substantially equal to the width W16 of the alignment mark (D).

The sizes of the ends 2b and 3b are formed so as to be substantially equal to the sizes of the alignment marks 15 and 16 as described above, whereby alignment can be easily effected. In addition, when the sealing material 2 and the anisotropic conductive material 3 are formed on the alignment marks 15 and 16, whether or not the ends 2b and 3b are formed at normal positions with respect to the alignment marks 15 and 16 can be determined very easily.

While the alignment marks and the ends includes substantially equal sizes on both the length (size in the direction of extension of the sealing section) and the width (size in the direction intersecting perpendicularly to the direction of extension of the sealing section), the above effect can be provided even if the sizes are substantially equal to each other with respect to one of the length and the width.

Figure 12:
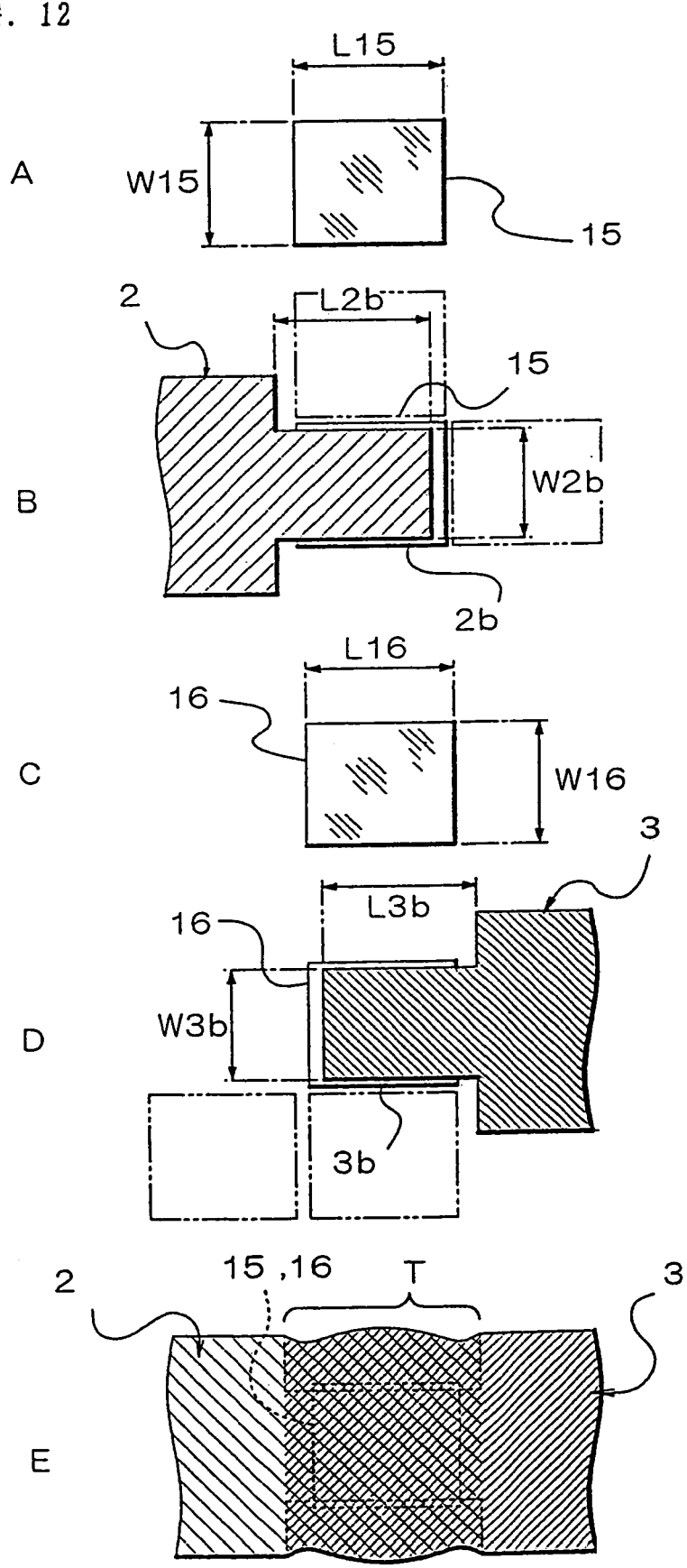
FIG. 12 includes diagrams showing enlarged planes A to E showing the positional relationship between alignment marks and ends of the sealing material and the anisotropic conductive material.

In the above example, as shown in FIG. 12, the widths W2b and W3b of the ends 2b and 3b are formed to be a half of the widths of portions other than the ends. As a result, when the sealing material 2 and the anisotropic conductive material 3 are joined, the width of the sealing section in the joined area T is substantially equal to the width of the sealing section other than the joined area (E).

In addition, the above example, the inner edge and the outer edge of the ends 2b and 3b are formed in a shape retracted from the periphery of portions other than the ends 2b and 3b. That is, the ends 2b and 3b are formed so as to be located in the center of the width range of the portion other than the ends. For this reason, when the ends 2b and 3b are joined, the sealing section expands in the joined area T with the width equal to both the inside and outside (E).

In the above example, the ends 2b and 3b are formed so as to be always superimposed on the positions just above the alignment marks 15 and 16, and the joined area T and alignment marks 15 and 16 are superimposed each other. However, as shown by two-dot chain lines in B and D of FIG. 12, the alignment marks 15 and 16 may be positioned so as to be adjacent to the ends 2b and 3b without being superimposed on the ends 2b and 3b. That is, the sealing material 2 and the anisotropic conductive material 3 may be formed so as to be located not at the positions just above the alignment marks, but at the positions adjacent to the alignment marks. Furthermore, they are formed so that the ends 2b and 3b are partially superimposed on the alignment marks.

Figure 13:
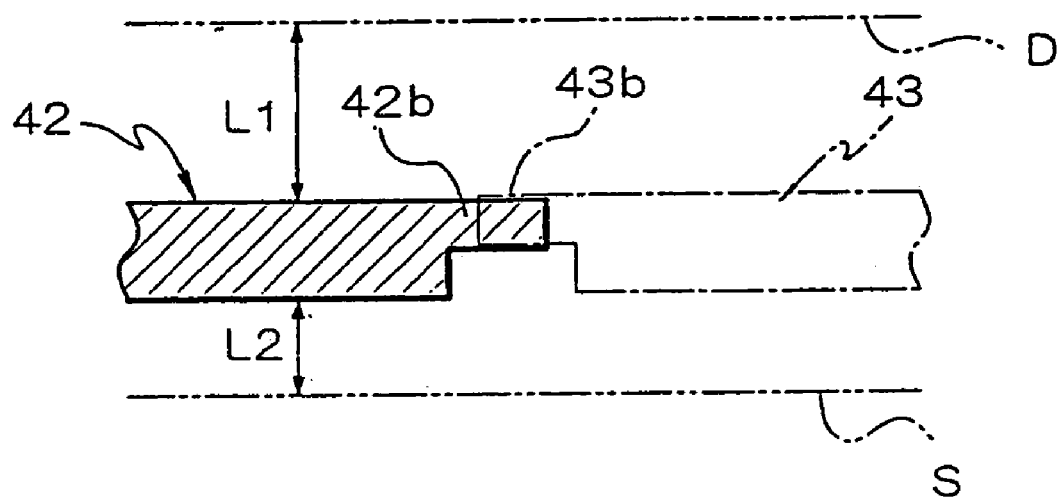
FIG. 13 is an enlarged plan view showing a state before joining of a further example of the shape of a joint portion between the sealing material and the anisotropic conductive material.

Description will now be given of another example of the end shape of the sealing material and the anisotropic conductive material with reference to FIGS. 13 and 14. In this example, in a manner to the above embodiment, the distance L1 between a sealing material 42 and an anisotropic conductive material 43 and the outer edge of a liquid crystal display area D is longer than the distance L2 between the sealing material 42 and the anisotropic conductive material 43 and a break predetermined line S. An end 42b of the sealing material 42 and an end 43b of the anisotropic conductive material 43 (shown by one-dot chain line in the figure) joined to the end 42b have widths thinner than portions other than the ends, and the ends 42b and 43b are formed to be deviated toward the liquid crystal display area D. That is, the outer edges of the ends 42b and 43b are formed in a shape greatly retracted to the inside from other portions of the sealing material 42 and the anisotropic conductive material 43, whereas the inner edges of the ends 42b and 43b are little retracted to the outside from the other portions.

Figure 14:
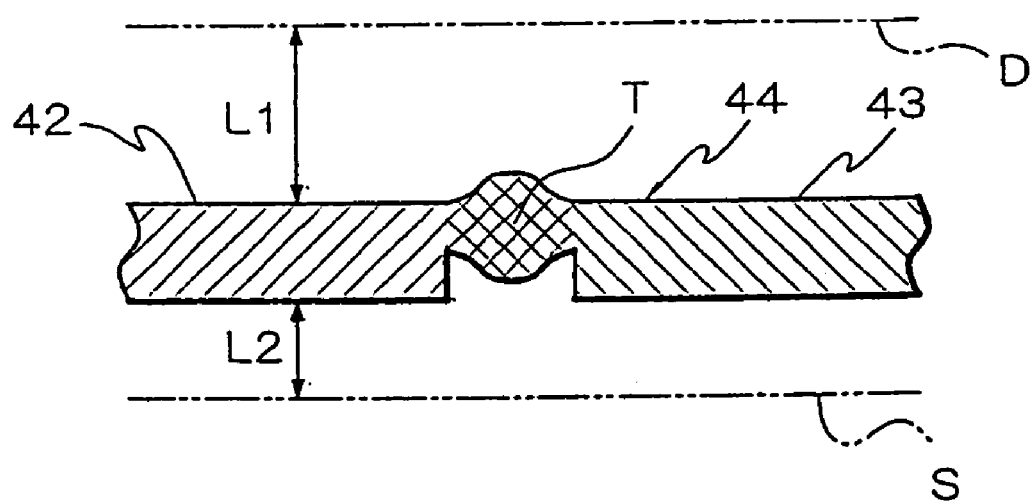
FIG. 14 is an enlarged plan view showing the state after the sealing material and the anisotropic conductive material shown in FIG. 13 are joined.

When the sealing material 42 and the anisotropic conductive material 43 formed as described above are joined by bonding substrates, a sealing section 44 shown in FIG. 14 is formed. In this case, a portion of the sealing section 44 in a joined area formed by joining the ends 42b and 43b is formed at a position deviated toward the liquid crystal display area D from portions of both sides of the joined area T. That is, the sealing section in the joined area T includes the outer edge retracted inward as compared to other portions, and includes the inner edge projecting inward as compared to the other portions.

In this example, since the end 42b of the sealing material 42 and the end 43b of the anisotropic conductive material 43 are formed in the shape deviated toward the liquid crystal display area D, the sealing section in the joined area T formed by joining both the ends 42b and 43b is entirely formed at a position deviated toward the liquid crystal display device from the other portions. As a result, the seal material is prevented from expanding toward the break predetermined line S set at a position closer to the sealing section rather than the outer edge of the liquid crystal display area D.

In all of the above examples, the end of the sealing material and the end of the anisotropic conductive material superimposed each other are formed at substantially coincided positions in the in and out directions (widthwise of the sealing section), and joined by bonding the substrates. Therefore, when the end of the seal material and the end of the anisotropic conductive material are joined, the ends securely abut against each other and are joined even if a slight widthwise displacement occurs, so that generation of air bubbles in the sealing section in the joined area, or occurrence of sealing defects due to the partial insufficiency of the sealing material is prevented.

In contrast to the above example, the distance L2 between the portions of both ends of the joined area T of the sealing section 44 and the break predetermined line S may be formed longer than the distance L1 between the portions of both sides of the joined area T of the sealing section 44 and the outer edge of the liquid crystal display area D. In this case, in contrast to the above, it is preferable that the end of the sealing material and the end of the anisotropic conductive material be deviated outward so that the portion of the sealing section in the joined area T does not expand inward.

Figure 15:
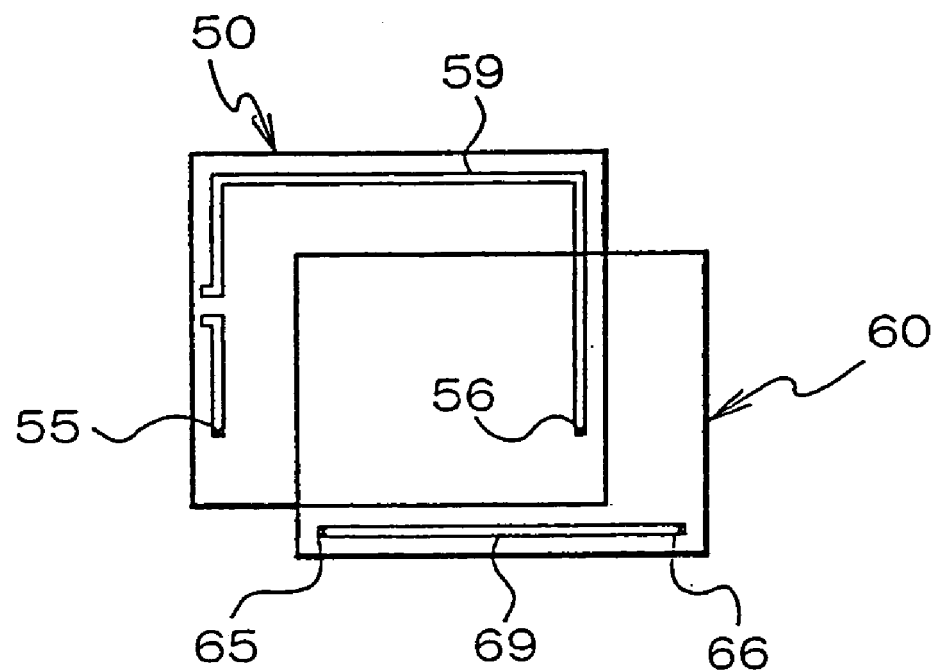
FIG. 15 is a schematic plan view schematically showing an example of the shape of a sealing material and an anisotropic conductive material.

FIG. 15 is a schematic perspective plan view showing a modification of the above embodiment. In a liquid crystal device shown in FIG. 15, a sealing material 59 is formed on a first substrate 50 with its both ends fitted to alignment marks 55 and 56, an anisotropic conductive material 69 is formed on a second substrate 60 with its both ends fitted to alignment marks 65 and 66, and the first substrate 50 and the second substrate 60 are bonded so that the alignment marks 55 and 56 and the alignment marks 65 and 66 face to each other. A sealing section of a liquid crystal panel formed in this case is constituted in the shape of a rectangular frame in a plane. The anisotropic conductive material 69 constitutes one side of the rectangular frame in a plane, and the sealing material 59 and the anisotropic conductive material 69 are joined at corners of the rectangular frame shape of the sealing section.

Usually, in a case where a sealing material and an anisotropic conductive material are joined in the middle of a linear portion of the sealing section, if the amount of the sealing material in a joined area is excessive, the sealing material protrude inward or outward of the sealing section. However, in a case where an insulating sealing material and a conductive sealing material are joined at corners as described above, the sealing material can expand in a direction of wider range on the outside of a joint when ends of both of the sealing materials are crushed each other. Therefore, even if the amount of the sealing material is somewhat excessive, the amount of protruding of the sealing material to the outside of a liquid crystal sealing area can be decreased.

Figure 16:
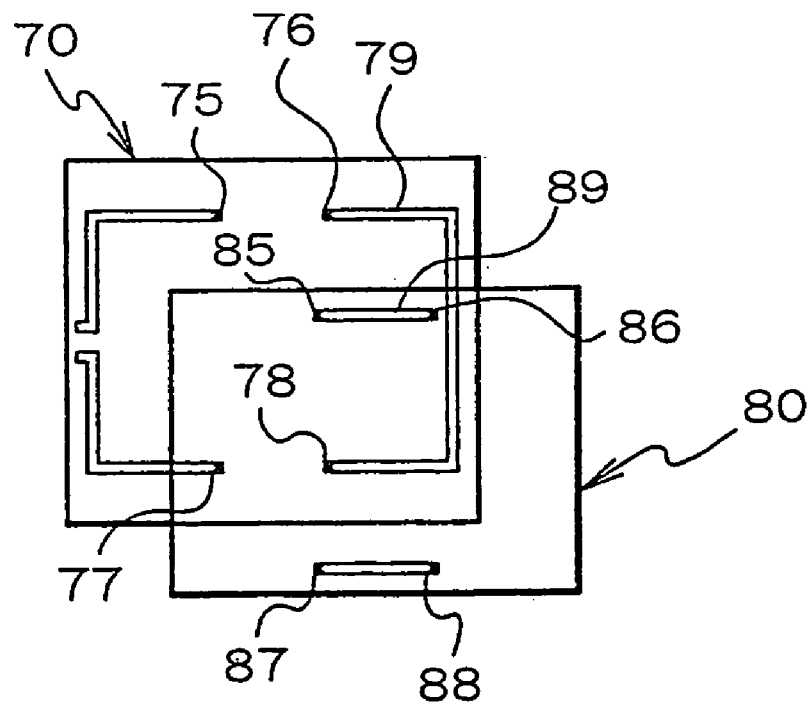
FIG. 16 is a schematic plane view schematically showing another example of the shape of a sealing material and an anisotropic conductive material.

In a liquid crystal device shown in FIG. 16, alignment marks 75, 76, 77, and 78 are formed on a first substrate 70, and a sealing material 79 having four ends arranged thereon is formed on these alignment marks. In addition, alignment marks 85, 86, 87, and 88 are formed on a second substrate 80, and an anisotropic conductive material 89 having four ends arranged thereon is formed on these alignment marks. If the first substrate 70 and the second substrate 80 are bonded, the sealing material 79 and the anisotropic conductive material 89 are joined at four sections. In this modification, the anisotropic conductive material 89 is joined at opposing two sides of the sealing material formed in the shape of a rectangular frame in a plane. A vertical conduction section formed by the anisotropic conductive material may be formed in any place of the sealing section, and may be formed at any section.

In the second substrate 60 shown in FIG. 15 and the second substrate 80 shown in FIG. 16, a perspective state is shown in which the alignment marks and the sealing materials are formed on the back of a substrate in the figure.

Figure 17:
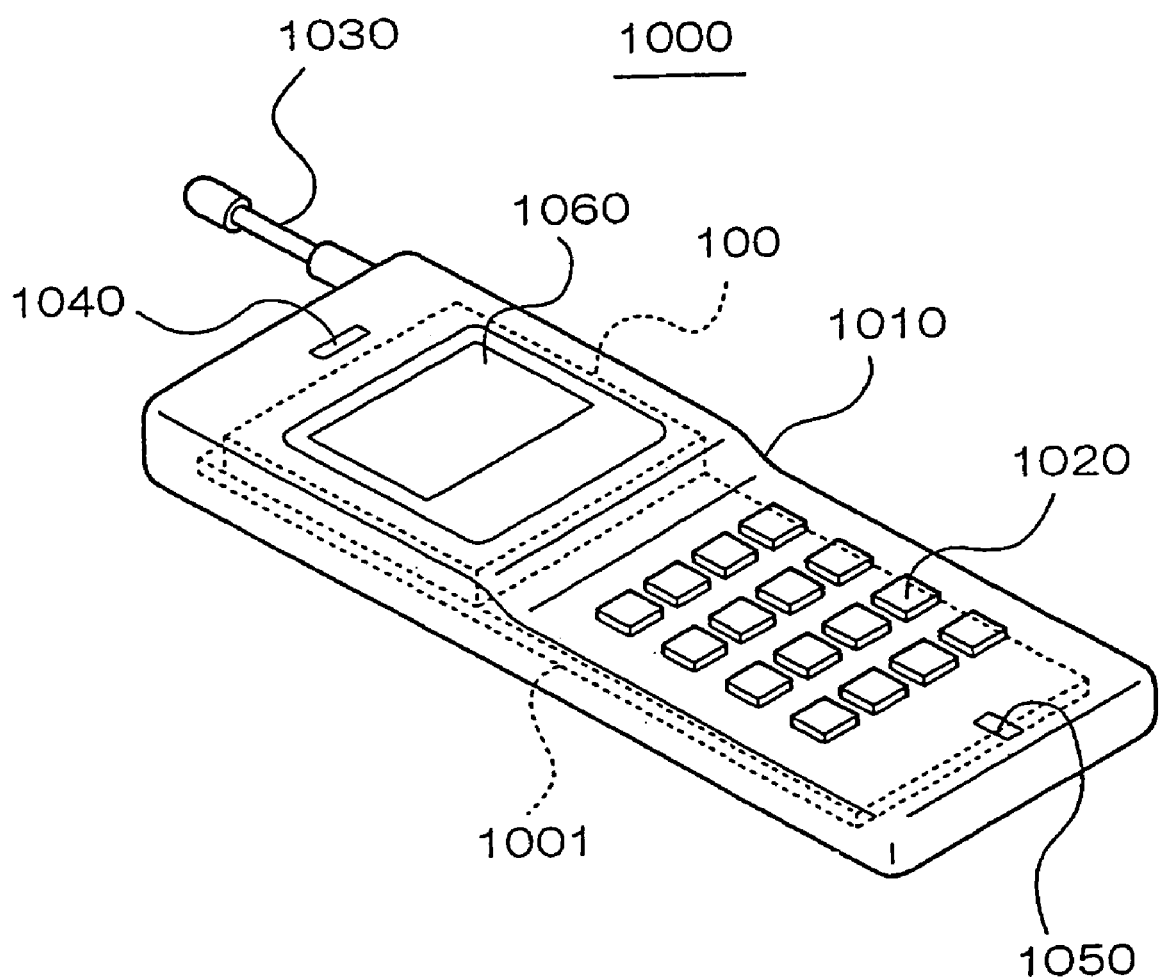
FIG. 17 is a perspective view showing the external appearance of a mobile phone that is an example of an electronic device containing the liquid crystal device of the above embodiment.

Finally, as an example of an electronic device according to the present invention, description will be given of an example of construction of a mobile phone containing a liquid crystal device 100 including the above liquid crystal panel 1 with reference to FIG. 17.

This example shows a mobile phone, and the outer surface of an outer casing 1010 is provided with a control section 1020 having many control buttons arranged thereon, an antenna 1030 formed in such a manner that it can be set up and stowed away, a sound generating section 1040, a sound detecting section 1050, and a display section 1060.

A circuit board 1001 is installed inside the outer casing 1010, and the above-described liquid crystal device 100 is mounted on the circuit board 1001. A liquid crystal display area in the liquid crystal device 100 is constituted so as to be visible in the display section 1060. A communication circuit is formed on the circuit board 1001, and the control buttons arranged on the control section 1020 are mounted. In addition, a speaker device is mounted at a position corresponding to the sound generating section 1040, and a microphone device is mounted at a position corresponding to the sound detecting section 1050, respectively. Furthermore, a microprocessor unit (MPU) composed of a data processing circuit for realizing various functions and a memory device is mounted.

Of course, the present invention is not limited to the above-described examples shown in the figures, and various modifications can be made without departing from the spirit and scope of the present invention.

INDUSTRIAL APPLICABILITY

According to the present invention, since the positions of the sealing material and the anisotropic material when the substrates are bonded to each other to form a liquid crystal panel can be accurately set and is easily confirmed, an insufficiency or excess of the sealing material in the joined areas between the sealing material and the anisotropic material can be avoided, so that sealing defects of liquid crystal or breaking defects of the substrates can be prevented. Therefore, in manufacturing the liquid crystal device, a high-grade liquid crystal panel can be constructed, and the yield of the product can be enhanced.

What is claimed is:

1. A method for manufacturing a liquid crystal device comprising liquid crystal sealed between a pair of substrates bonded by a sealing section;

wherein one of a sealing material and an anisotropic conductive material is arranged on the surface of one of the substrates;

the other one of the sealing material and the anisotropic conductive material is arranged on the surface of the other one of the substrates;

an end of at least one of the sealing material and the anisotropic conductive material to be joined to the other one is formed to have a width thinner than other portions or formed in a thin wall, wherein the ends formed to have a width thinner than other portions is formed in a shape such that both of an inner edge and an outer edge thereof are retracted from other portions; and the pair of substrates is bonded to each other so that the end of the sealing material and the end of the anisotropic conductive material are joined to each other, and the sealing section is formed in the shape of surrounding liquid crystal by the sealing material and the anisotropic conductive material joined to each other.

2. The method for manufacturing a liquid crystal device as claimed in claim 1, wherein the distance between portions of both sides of a joined area between the sealing material and the anisotropic conductive material and an outer edge of a liquid crystal display area formed inside the sealing section is formed longer than the distance between the portions of both sides of the joined area and a substrate outer edge located outside the sealing section; and an outer edge of the end formed to have a width thinner than the other portions is formed in a flat shape with respect to the other portions, or formed in a shape retracted from the portions of both sides of the joined area.

3. The method for manufacturing a liquid crystal device as claimed in claim 1, wherein the distance between portions of both sides of a joined area between the sealing material and the anisotropic conductive material and an outer edge of a liquid crystal display area formed inside the sealing section is formed shorter than the distance between the portions of both sides of the joined area and a substrate outer edge located outside the sealing section; and an inner edge of the end formed to have a width thinner than the other portions is formed in a flat shape with respect to the other portions, or formed in a shape retracted from the portions of both sides of the joined area.

* * * * *